United States Patent [19]
Moosmann

[11] 3,775,022
[45] Nov. 27, 1973

[54] PRESSURE OPERATED DEVICE FOR A PRESSURE OPERATED SERVO-TURBINE

[76] Inventor: Alois Moosmann, 11, Muttergartenweg, Stuttgart-Birkach, Germany

[22] Filed: Mar. 3, 1972

[21] Appl. No.: 231,590

[52] U.S. Cl. .................................. 415/61
[51] Int. Cl. ............................... F01d 1/24
[58] Field of Search ........................ 415/1, 61

[56] References Cited
UNITED STATES PATENTS
3,169,746  2/1965  Moosmann .................. 415/61

*Primary Examiner*—C. J. Husar
*Attorney*—Watson, Cole, Grindle & Watson

[57] ABSTRACT

A pressure operated device for a pressure operated servo-turbine actuating a screw drive spindle or the like for driving a part of a machine tool. In the device the means of diverting a pressure medium jet, acting on reversible servo-turbine blades which can turn in opposite directions, can be adjusted by pressure medium pulses from a jet nozzle control device. The control vane of the latter can be set by means of a setting part which can be mechanically displaced or tilted, in accordance with setting or regulation deviations.

8 Claims, 7 Drawing Figures

PRESSURE OPERATED DEVICE FOR A PRESSURE OPERATED SERVO-TURBINE

BACKGROUND OF INVENTION

1. Field to which Invention Relates

This invention relates to a pressure operated device for a pressure operated servo-turbine for the actuation of a screw drive spindle or the like for setting or regulating devices, such as, more particularly, a screw drive spindle for displacing a slide or the like of a machine tool.

2. The Prior Art

The setting of tool or workpiece holding devices on partly or completely automatically operating machine tools is carried out using servo-motors of the most various different types in accordance with the requirements to be met. These servo-motors are controlled by feelers, which are moved along templates or masters for the purpose of copying, or by a numerical data input from an information storage device, which as a rule is a punched tape, via electrical means, such as an electromagnetically operated drive piston in the case of hydrostatically operating servo-motors, such as pistons and cylinders, or radial or axial piston motors. It is also a known practice to divide the desired slide travel into as many part-displacements or steps as possible and to transmit the latter to an electrical stepping motor. The stepping motor reacts very rapidly to each step signaled to it and the number of steps per unit time can be very high. On this basis control devices are known in the case of which a stepping motor transmits its rotary steps to a pressure piston, which drives the servo-motor. A screw-threaded part forming part of the servo-motor shaft. If the stepping motor turns to drive the piston, the latter is also moved axially by the thread and so controls or drives the servo-motor in one direction of rotation or the other until the screw-thread between the drive piston and the servo-motor shaft has screwed back owing to its movement and has screwed the control piston back into the normal or neutral position.

Owing to the generally accepted limits of hydrostatic servo-systems as regards their sensitivity of response and therefore as regards the minimum deviation between intended and target values, the accuracy which can be achieved is limited even in the case of known systems of known stepping motor drive piston hydraulic motor systems. Apart from the problems which are caused by the hydrodynamic forces at the control edges of the drive piston, the lengths of the drive piston and the motor shaft give rise to problems of thermal sensitivity since they are influenced by the variations in the temperature of the hydraulic oil use and therefore undergo corresponding changes in length. Furthermore, every screw-thread engagement is subject to a certain degree of play, in the case of the use of rolling elements with or without preloading, there is a certain elasticity. Added to this there are certain uncertainties due to limited stiffness of the motor shaft and the motor housing which make themselves felt more especially when the direction of movement is reversed. All these difficulties can hardly be influenced to an appreciable extent by improving manufacturing accuracies.

SUMMARY OF INVENTION

In order to increase the sensitivity of response and the accuracy of the machine tools or the like a hydrodynamic servo-motor has been developed in accordance with the invention which has a very high sensitivity. In this system a feeler displacement of 0.0002 mm suffices to reverse the direction of movement of the machine slide or carriage and a feeler displacement of 0.0004 mm is sufficient to bring about a reversal from full power operation in one direction to full power operation in the other direction.

In the case of the extraordinarily high degree of elasticity for this range of accuracy with presently conventional machine tools it is convenient to exclude the latter from the regulation circuit or loop, more especially having regard to the stabilisation of the servo-system. By using a correspondingly rigid construction of the machine tool itself and of its transmission parts the accuracy inherent in the control system can be transmitted to the workpiece to be machined.

In connection with attaining the above-mentioned aim the present invention is based upon a servo-control device using a pressure operated turbine, in the case of which the device for diverting a pressure medium jet, acting on reversible servo-turbine plates which can turn in opposite directions, can be adjusted by pressure medium pulses from a jet nozzle control device, whose control vane can be set by means of a setting part, which can be mechanically displaced or tilted, in accordance with the setting or regulation deviations.

The invention resides essentially in that the target value data supplied by a stepping motor and the actual value data device from the servo-turbine of the control device are compared with each other in a value comparison device and the differences between the target and actual values are converted into movements of a cam part, whose cam face can be sensed by a setting part of the control vane of the jet nozzle control device.

Preferably a differential drive is used as a value comparison device, and it is supplied with the target value data of the stepping motor and the actual value data of the servo-turbine from both sides via shafts and its differential movements are transmitted to the cam part.

The cam part can be constructed in various different manners. Preferably it consists of a rotary cam disc, driven for example by a spur gear wheel of the differential drive, with a control edge or the like, against which one end of a pin-shaped sensing or setting part lies whose other end engages the control vane of the jet nozzle control device. In order to cut out thermal effects on the accuracy of the control device as far as possible the cam disc can be borne on a pin, for example, which is carried in rolling element bearings so as to be rotatable and axially displaceable, and the end, carrying the cam disc, of the pin is supported by means of a pin on a fixed bearing, while the free end of this pin is supported by means of a further pin in an axially yielding bearing body.

For the accuracy of the control device it is very important for the invention that the bearing end face of the pin, which is arranged on the end, carrying the cam disc, of the pin of the cam disc, lie exactly in the plane of the control face of the cam disc, so that the influence of variations in temperature at this position is practically deprived of effect.

LIST OF SEVERAL VIEWS OF DRAWING

Further features of the invention are described in more detail in the following description referring to a drawing.

FIG. 4 shows a view of the guide strip spring.

FIG. 5 shows a view of the control face of the cam disc.

FIG. 6 is a view of the control shoulder or offset portion.

DESCRIPTION OF PREFERRED EMBODIMENTS

Figure 1:
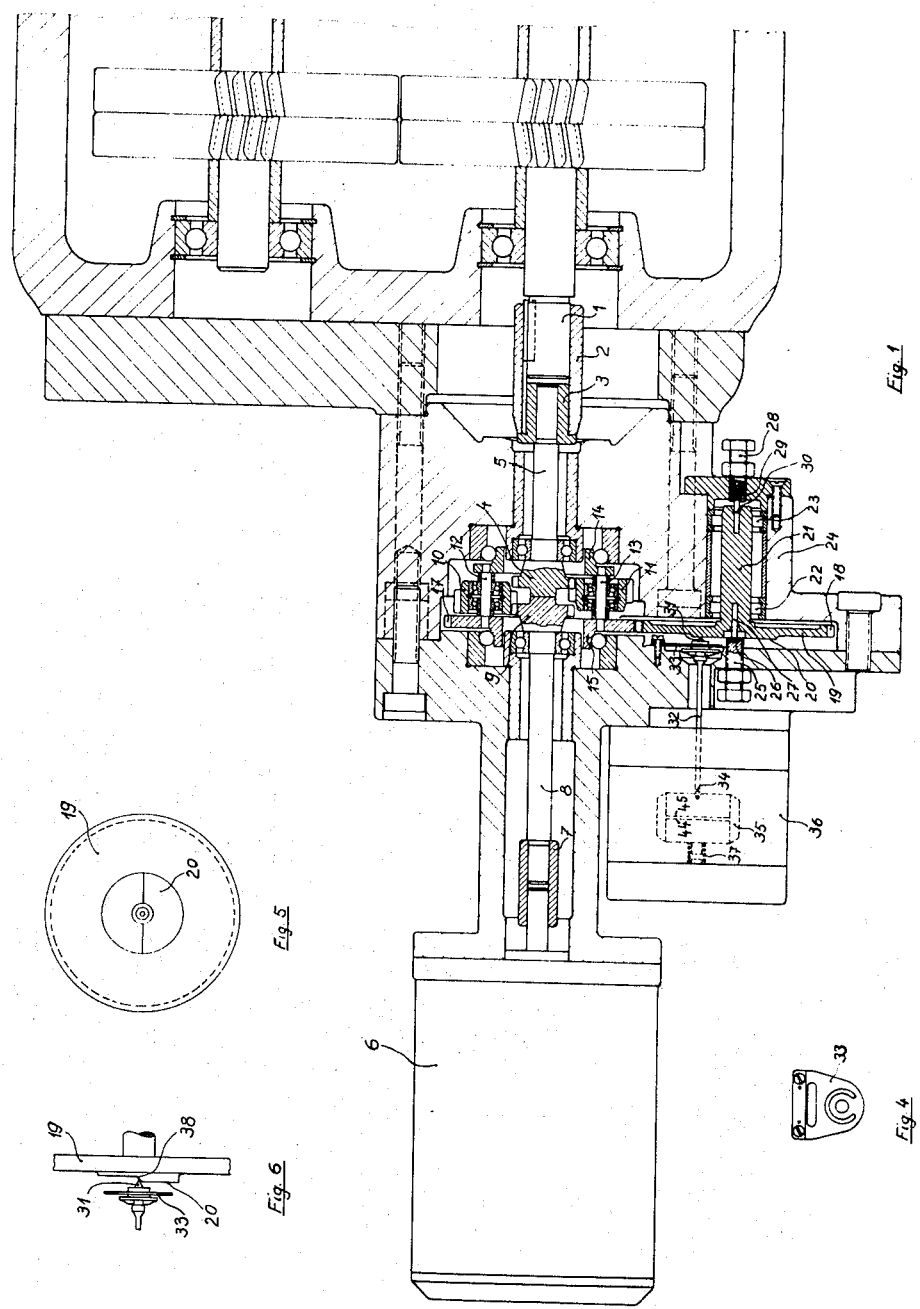
FIG. 1 shows a longitudinal section through the pressure medium control device.
Figure 2:
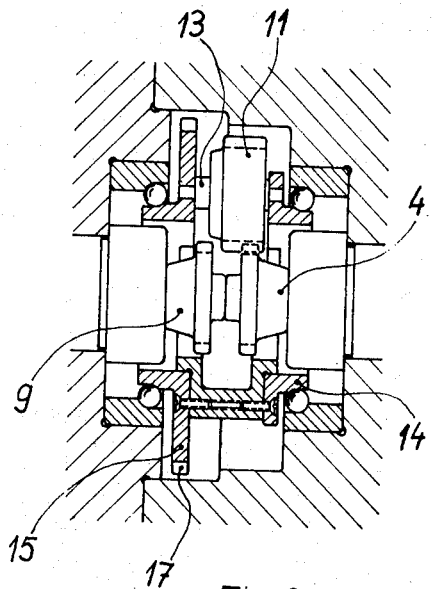
FIG. 2 shows a longitudinal section through the differential drive.
Figure 3:
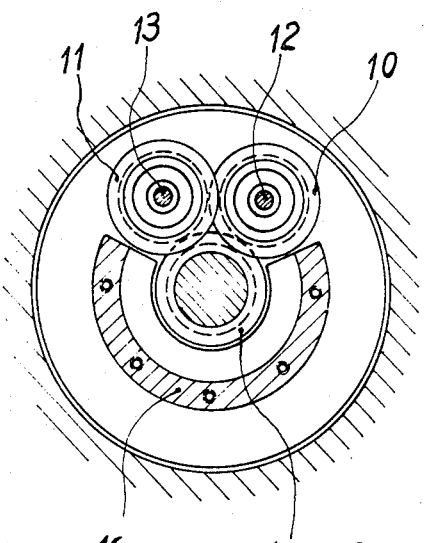
FIG. 3 shows a cross section through the differential drive.

FIG. 1 shows the shaft stub 1 to be a shaft of the servo-turbine. The latter is connected via couplings 2 and 3 with the differential sun wheel 4 of a shaft 5. These transmission parts transmit actual value of the servo-motor to be controlled to the differential transmission. The target value is passed by a stepping motor 6 via a coupling 7, a shaft 8 and a sun wheel 9 to the differential transmission. The two planetary wheels 10 and 11 are journalled on pins 12 and 13 in carriers 14 and 15, which are connected together by means of a housing 16. The carrier 15 is provided with spur gear teeth 17, which mesh with teeth 18 of a cam disc 19. The front face 20 of the latter is so made that its two surface havles lie in two planes offset by 0.001 mm in the axial direction. The two planes or halves or one of them forms a control edge 38 (see FIG. 6).

The cam disc 19 is capable of being moved axially and rotated in one housing half with its pin or shaft 21 and the two cylinder roller bearings 22 and 23. The axial guidance of the cam disc is brought about in an adjustable manner by means of a screw 25. The latter is provided with a thrust bearing 26 of sapphire, and against the bearing 26 there lies a tungsten carbide pin 27 of the cam disc so that the cam disc is held firmly against the screw 25. On the opposite side there presses a screw 28 acting via a thrust bearing 29 mounted axially resiliently in the screw itself, which presses against a tungsten carbide pin 30 of the cam disc 19 so that the latter is held in abutment against the screw. This ensures that temperature changes in the longitudinal direction of the pin 21 do not have any effect on the control faces 20.

The control faces 20 are sensed by the sapphire needle 31 of a pin-shaped setting part 32, which is guided in a friction-free manner by a strip spring 33. The pin-shaped setting part 32 has a control vane 35 which has an end 34 opposite to the sapphire needle 31 which acts on the control vane 35 which consists of two oppositely placed knife edges 44 and 45 and controls the air jet of a jet nozzle control device 36. The control vane 35 is under the action of a spring 37 urging it towards the pin-shaped setting part 32. The bearing face of the tungsten carbide pin 27, which lies against the bearing face of the thrust bearing 26, must be so arranged that it lies exactly in the playing of the control face 20 of the cam disc 19. This cuts out the influence of temperature variations on the feeling control device practically completely. In the case of the pin-shaped setting part 32 a measure in this respect is not necessary because this setting part lies in the flow of the spent air of the jet nozzle device and is thus held at a practically constant temperature.

Figure 7:
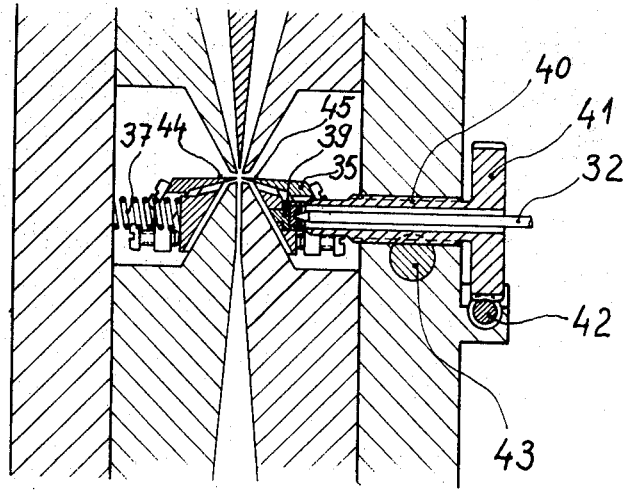
FIG. 7 shows a section through the knife group of the control feeler with displacement limiting means.

The control offset 38 with a height of 0.001 mm on the front face 20 of the cam disc 19 is so set by means of a screw 25 that on turning the cam disc 19 the pin-shaped setting part 32 and thus the control vane 35 is pressed through a very small distance of approximately 0.0002 to 0.0003 mm. This movement then brings about the rotation of the servo-turbine in the one direction of rotation. If the cam disc 19 is turned in the opposite direction, the control disc 19 is removed from the sapphire needle 31 so that the latter can move up against the half of the control surface 20 which is 0.001 mm lower. Owing to the action of the spring 37 the pin-shaped setting part 32 and the control vane 35 follow this small movement. The servo-turbine changes its direction of rotation and continues moving until the sapphire needle 31 comes to rest in the middle of its displacement. This offset 38 of the front surface 20 of 0.001 mm would appear to be the maximum which can be reached in manufacture. On the other hand, however, only 0.0004 mm of displacement on the control vane 35 is required. For the actual construction the limitation of the displacement of the vane 35 shown in FIG. 7 towards the front surface 20 is a simplification, since it makes the height of the offset 38 on the front surface 20 of the cam disc 19 devoid of any importance. A tungsten carbide bush 39 on the control vane 35, against which the pin-shaped setting part 32 rests, is acted upon by the spring 37 and abuts against the front face of a threaded sleeve, if it is not moved clear of it by the pin-shaped setting part 32. The worm wheel coupling between a screw head 41 and a worm gear 42 makes possible a particularly sensitive or fine setting of threaded sleeve 40 in conjunction with a thread locking pin 43.

I claim:

1. In combination with a pressure operated servo-turbine, especially for machine tools, having reversible servo-turbine plates capable of turning in opposite directions and adjustable by pressure medium pulses from a jet nozzle control device whose control vane is capable of being set by means of a setting part which can be mechanically displaced in accordance with regulation deviations, a stepping motor, a value companion device, said servo-turbine being operatively interconnected with said stepping motor through said value comparison device which serves to compare the target value data supplied by said stepping motor with the actual data derived from said servo-turbine, a pressure medium operated device comprising a rotatably mounted cam part operatively interconnected with said value comparison device, said cam part having a cam face, said setting part of said control vane of said jet nozzle control device being in contacting engagement with said cam face, whereby the differences between the target and the actual values are converted into movements of said cam part.

2. The combination according to claim 1 wherein said value comparison device comprises a differential drive mechanism and a first drive shaft supplying the target value data of said stepping motor thereto, and further comprises a second drive shaft supplying the actual value data of said servo-turbine to said mechanism, whereby the deviations between said stepping motor and said servo-turbine are transmitted to said cam part.

3. The combination according to claim 1 wherein said cam part comprises a rotary journalled cam disc, said differential drive mechanism having a spur gear wheel driving said cam disc, said face having surfaces offset in an axial direction forming a control edge, said setting part comprising an elongated pin, one end of said pin abutting against said control edge and the other end of said pin engaging said control vane of said jet nozzle control device.

4. The combination according to claim 1 wherein said cam part comprises a cam disc having an axial shaft journalled in roller element bearings for axial rotation, means comprising pin members at opposite axial ends of said cam part for permitting axial movement thereof, one of said pin members being journalled in a stationary bearing body and the other of said pin members being supported in an axially yielding bearing body.

5. The combination according to claim 4 wherein screw means are provided for adjusting each said bearing body.

6. The combination according to claim 3 wherein a strip spring is provided for guiding said elongated pin in a friction-free manner while abutting against said control edge.

7. The combination according to claim 1 wherein said control vane comprises two oppositely disposed knife edges lying in a plane perpendicular to the jet direction of said jet nozzle control device, spring means in said control device urging said control vane against a stationary abutment on said control device.

8. The combination according to claim 7 wherein said abutment comprises an end face of an axially displaceable threaded sleeve.

* * * * *